(12) United States Patent  (10) Patent No.: US 8,756,521 B1
Farchmin et al.  (45) Date of Patent: Jun. 17, 2014

(54) SYSTEMS AND METHODS FOR AUTOMATIC VISUALIZATION CONFIGURATION

(75) Inventors: David W. Farchmin, Grafton, WI (US); John J. Baier, Mentor, OH (US); Michael D. Kalan, Highland Heights, OH (US); Randall A. Marquardt, Waukesha, WI (US); Richard A. Morse, Hudson, OH (US); Stephen C. Briant, Moon Township, PA (US); Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2392 days.

(21) Appl. No.: 10/955,460

(22) Filed: Sep. 30, 2004

(51) Int. Cl.
*G06F 3/048* (2013.01)

(52) U.S. Cl.
USPC ............ 715/771; 715/762; 715/765; 715/866

(58) Field of Classification Search
USPC .......................... 715/517, 762, 765, 866, 771
See application file for complete search history.

(56) References Cited

U.S. PATENT DOCUMENTS

| | | | | | |
|---|---|---|---|---|---|
| 5,859,978 | A | * | 1/1999 | Sonderegger et al. | 709/226 |
| 6,115,713 | A | * | 9/2000 | Pascucci et al. | 1/1 |
| 6,222,540 | B1 | * | 4/2001 | Sacerdoti | 345/581 |
| 6,571,282 | B1 | * | 5/2003 | Bowman-Amuah | 709/219 |
| 6,643,555 | B1 | * | 11/2003 | Eller et al. | 700/83 |
| 6,772,144 | B2 | * | 8/2004 | Brid et al. | 707/3 |
| 6,901,403 | B1 | * | 5/2005 | Bata et al. | 707/101 |
| 6,966,033 | B1 | * | 11/2005 | Gasser et al. | 715/738 |
| 7,072,934 | B2 | * | 7/2006 | Helgeson et al. | 709/203 |
| 7,093,207 | B1 | * | 8/2006 | Liao et al. | 716/1 |
| 7,197,715 | B1 | * | 3/2007 | Valeria | 715/747 |
| 7,242,988 | B1 | * | 7/2007 | Hoffberg et al. | 700/28 |
| 7,272,660 | B1 | * | 9/2007 | Powers et al. | 709/238 |
| 7,315,985 | B1 | * | 1/2008 | Gauvin et al. | 715/734 |
| 7,461,158 | B2 | * | 12/2008 | Rider et al. | 709/229 |
| 7,565,610 | B2 | * | 7/2009 | Li et al. | 715/736 |
| 7,603,458 | B1 | * | 10/2009 | Sexton et al. | 709/224 |
| 7,610,559 | B1 | * | 10/2009 | Humpleman et al. | 715/762 |
| 2002/0070965 | A1 | * | 6/2002 | Austin | 345/762 |
| 2003/0058280 | A1 | * | 3/2003 | Molinari et al. | 345/771 |
| 2003/0126195 | A1 | * | 7/2003 | Reynolds et al. | 709/203 |
| 2003/0135609 | A1 | * | 7/2003 | Carlson et al. | 709/224 |
| 2004/0024812 | A1 | * | 2/2004 | Park et al. | 709/203 |
| 2004/0168115 | A1 | * | 8/2004 | Bauernschmidt et al. | 715/500 |

(Continued)

OTHER PUBLICATIONS

Gasser et al.; Method and Apparatus for Representing resource in a Computer System Environment. May 18, 2001; 60 pages.*

(Continued)

*Primary Examiner* — Linh K Pham

(74) *Attorney, Agent, or Firm* — Amin, Turocy & Watson, LLP

(57) ABSTRACT

The invention provides systems and methods that format data based at least in part upon attributes associated with such data. Data attributes can be related to a number of various factors in a data driven architecture such as the source of the data, the data subscriber and the path employed to convey the data from the source to the subscriber. In addition, data formatting can employ various levels of complexity and data presentation can vary dependent on various factors such as display device and user to which the data is presented. For example, the format of the data can refer to the size, shape, color, and graphics associated therewith.

30 Claims, 12 Drawing Sheets

(56) References Cited

U.S. PATENT DOCUMENTS

| | | | |
|---|---|---|---|
| 2005/0154995 A1* | 7/2005 | Miller et al. | 715/772 |
| 2005/0198247 A1* | 9/2005 | Perry et al. | 709/223 |
| 2006/0277498 A1* | 12/2006 | Mann et al. | 715/825 |

OTHER PUBLICATIONS

Morrie Gasser; Method and Apparatus for Presenting information to a user of a Computer system. Apr. 10, 2000.*

* cited by examiner

SYSTEMS AND METHODS FOR AUTOMATIC VISUALIZATION CONFIGURATION

TECHNICAL FIELD

The subject invention relates to industrial control systems, and more particularly to systems and methods for automatic visualization and display of data based upon attributes associated therewith.

BACKGROUND OF THE INVENTION

Industrial controllers are special purpose processing devices used for controlling industrial processes, machines, manufacturing equipment, and other factory automation applications. In accordance with a control program or routine, an industrial controller can measure one or more process variables or inputs representative of the status of a controlled process, and change outputs effecting control of the process. The inputs and outputs can be binary, (e.g., on or off), and/or analog assuming a continuous range of values. The control routine can be executed in a series of execution cycles with batch processing capabilities, and can comprise one or more functional units. Such a control routine can be created in a controller configuration system having tools and interfaces whereby a user can implement a control strategy using programming languages or graphical representations of control functionality. The control routine can be downloaded from the configuration system into one or more controllers for implementation of the control strategy in controlling a process or machine.

The measured inputs received from a controlled process and the outputs transmitted to the process can pass through one or more input/output (I/O) modules in a control system, which serve as an electrical interface between the controller and the controlled process, and can be located proximate or remote from the controller. The inputs and outputs can be recorded in an I/O table in processor memory. Input values can be asynchronously read from the controlled process by one or more input modules and output values can be written directly to the I/O table by a processor for subsequent communication to the process by specialized communications circuitry. An output module can interface directly with a controlled process, by providing an output from an I/O table to an actuator such as a motor, drive, valve, solenoid, and the like.

During execution of the control routine, values of the inputs and outputs exchanged with the controlled process pass through the I/O table. The values of inputs in the I/O table can be asynchronously updated from the controlled process by dedicated scanning circuitry. This scanning circuitry can communicate with input and/or output modules over a bus on a backplane or network communications. The scanning circuitry can also asynchronously write values of the outputs in the I/O table to the controlled process. The output values from the I/O table can be communicated to one or more output modules for interfacing with the process. Thus, a controller processor can simply access the I/O table rather than needing to communicate directly with the controlled process.

In distributed control systems, controller hardware configuration can be facilitated by separating the industrial controller into a number of control modules, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines.

Various control modules of a distributed control system can be spatially distributed along a common communication link in several racks. Certain I/O modules can thus be located proximate a portion of the control equipment, and away from the remainder of the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values can be used by a processor (e.g., a PLC) for performing control computations.

In such distributed control systems, data can be collected, analyzed and disbursed throughout a control architecture. In some instances, data related to a particular system and/or process can be conveyed to a user wishing to inspect desired data values. Further, data can relate to multiple aspects of a particular process and can be routed to a particular destination utilizing a number of means. Conventionally, data transmitted throughout a control architecture is typically viewed before it is configured to modify its appearance. In addition, it can be difficult to determine which channels are employed to transmit data from a source to a particular destination. Thus, data is needed that can be easily modified and presented relative to various properties associated with such data.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The invention provides systems and methods for automatic visualization and display of data based upon attributes associated therewith. Data received by a subscriber can have various attributes indicative of a source of the data and/or channels employed to deliver the data to the subscriber. For example, some data sources can only provide data with a time stamp, while others can support transactional capabilities, and still others can support more extensive attributes with varying degrees of sophistication. In addition, some devices (e.g., PLCs, controllers, etc.) can perform as servers adding attributes to data from other devices, while other devices can have as proxy servers for data in order to satisfy the data servicing requirements from automation devices for heavily utilized high overhead data. It is to be appreciated that in a data driven architecture, attributed data can be served in a hierarchical manner to designate the source and channels through which the data is routed. As known, data driven architecture can provide additional information to data subscribers in a particular control system to allow for more efficient and robust utilization of system resources. Partially attributed data can be published or made available to selected subscribers that can wish to view intermediate attributes of the data that relate to intermediate channels of data routing.

A common data object shell definition can provide a common framework for interoperable access to data on a plant floor in a manner that is amenable to manufacturing execution systems (MES) and/or enterprise resource planning (ERP) integrated information applications. Included in this data object shell definition can be tiered levels of human machine interface (HMI) visualization attributes for that data. A directory can be employed to provide a logical description to the user of devices in a factory, for example. The directory can provide a logical depiction of data tailored to the vernacular and/or plant organization of a user's industry. Thus, the directory can translate the logical view of the factory into physical locations and/or addresses needed for the required data access and/or associations.

According to one aspect of the invention, a system that provides automatic visualization configuration in an industrial environment is employed, comprising an input component that receives data from a source, wherein the data accumulates attributes based on data channeling from the source to the input component; and an analyzer that determines visualization attributes from the accumulated attributes and configures display properties of the data based at least in part upon the visualization attributes that are utilized during display of the data.

According to another aspect of the invention, a computer implemented method for automatic configuration of data is utilized that comprises receiving data from a source; analyzing the attributes associated with the data; determining data appearance configuration based on the analysis; and utilizing the configuration to display the data to a user.

According to yet another aspect of the invention, a computer implemented method for formatting data is employed comprising obtaining data from a source; determining attributes associated with the data based at least upon servers employed to communicate the data; and formatting the data based at least in part upon the attributes.

According to still yet another aspect of the invention, a computer implemented method for displaying data is employed comprising means for receiving data rules associated with visual formatting of the data; means for determining visual formatting properties associated with the data; and means for presenting the data on the display device based at least in part upon the visual formatting properties of the data. To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
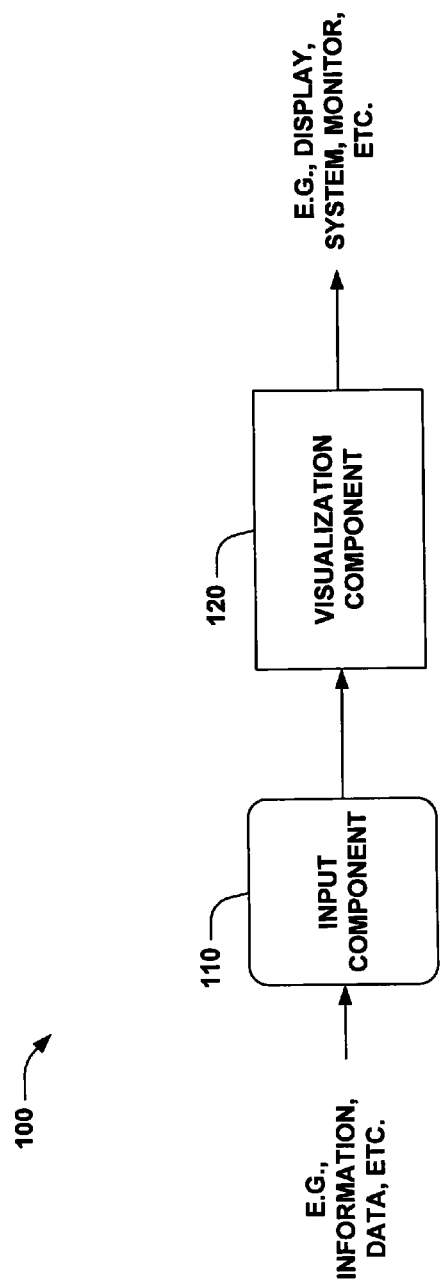
FIG. 1 illustrates an exemplary visualization component system in accordance with an aspect of the current invention.

The various aspects of the subject invention will now be described with reference to the drawings, wherein like reference numerals are used to refer to like elements throughout. The invention relates to systems and methods that provide automatic visualization configuration and/or display in a data driven architecture. In such architecture, data can be received from any number of components, devices, systems, etc. throughout a factory, plant and the like. In addition, such architecture can provide various channels for information to be routed throughout the system such as servers, proxy servers, hubs and the like. In one aspect of the subject invention, the handling and processing of this data can be selectively transactional in nature. In addition, attributes associated with this data can be as simple as a time stamp or include units and data quality parameters, or include more sophisticated attributes such as transactional processing parameters, and various levels of visualization attributes.

Referring now to FIG. 1, an exemplary system 100 comprises an input component 110 that receives information from a source and transmits such information to a visualization component 120. The input component 110 can receive information from any number of sources to which the input component 110 is connected. For example, the input component 110 can communicate with external devices located throughout a data driven architecture to receive information from various sources related to the control architecture of the system. Such information can be sent via a specific protocol or communication standard such as Ethernet, ControlNet, DeviceNet, Profibus, CAN bus or the like. Further, the communication can be accomplished via a wireless protocol such as wireless Ethernet, wireless LAN, Bluetooth, etc. In addition, the input component 110 can receive data through various media such as twisted pair, coaxial cable, serial cable and the like. The input component 110 can be a hardware interface such as a serial port, USB port, wire terminal, etc. Alternatively, the input component 110 can be software in nature such that data is received and transmitted to a software interface such as an API, for example. The input component 110 can alternatively be a hardware device such as wire, cable, port, etc.

The information received by the input component 110 can be related to specific processes, machines and/or data associated with various aspects of machine control, for example. Such information can be transmitted to the visualization component 120 to modify various properties related to visual format and display of the information to a user. The visualization component 120 can change visual properties associated with received information based on various parameters. The visualization component 120 can be employed to change any number of display properties such as color, font, size, location, etc. of the information. Additionally or alternatively, data can be displayed in various levels of detail and illustrated utilizing graphics such as bar graphs, dials, pie charts, and the like. Various external visual aids can be associated with the data and displayed in place of or along side the data to provide context for the information, such as bitmaps, vector based graphics, etc.

In order to modify the information displayed to a user, the visualization component 120 can analyze received data to determine if various properties and/or attributes are associated with the data. For example, attributes relating to the source of the data can be determined as well as the manner (e.g., channels, servers, data routing, etc.) in which a subscriber received such data. The visualization component 120 can dynamically format and generate data based on the visualization attributes associated with the data objects to be displayed. Formatting of data can be based upon user definable and/or configurable "skins" for preferences of appearance, etc. and/or user definable configuration rules for visualization formatting. In addition, visualization information can be selected based upon the role and/or location of a user, capabilities of a display device, process to be viewed, location of a process to be viewed, time and/or business logic, for example. Further, additional attributes can be employed to force changes on applicable data.

The input component 110 can facilitate communication with external devices utilizing a number of protocols and/or standards. Further, the communication link that connects the external hardware with the input component 110 can obtain connectivity many different ways. Various protocols can be employed between the input component 110 and external sources and such protocols can be selected by the user and/or detected by the input component 110 to begin communication between devices. In another approach, the system 100 can receive and/or modify data. For example, the input component 110 can be associated with an industrial controller, a distributed I/O module, a data acquisition board or the like. Data can be transmitted from the input component 110 to the visualization component 120 utilizing one or a plurality of different mediums such as coaxial cable, ControlNet, Profibus, Ethernet, etc.

The visualization component 120 can output data to a plurality of disparate devices to display such data to a user(s). Such data can be formatted to accommodate various aspects of the device that receives such data and/or the user viewing the data. In one aspect of the invention, after the formatted data has been sent to a display device, a user can modify the display of such data. In addition, data can be sent to a desktop monitor with a particular size and resolution capability. Display of such data can be modified based on other data and/or display constraints related to disparate processes associated with the monitor. In another example, the same data can be transmitted to a handheld PC with a different (e.g., smaller) screen size, resolution, processes, etc.

Figure 2:
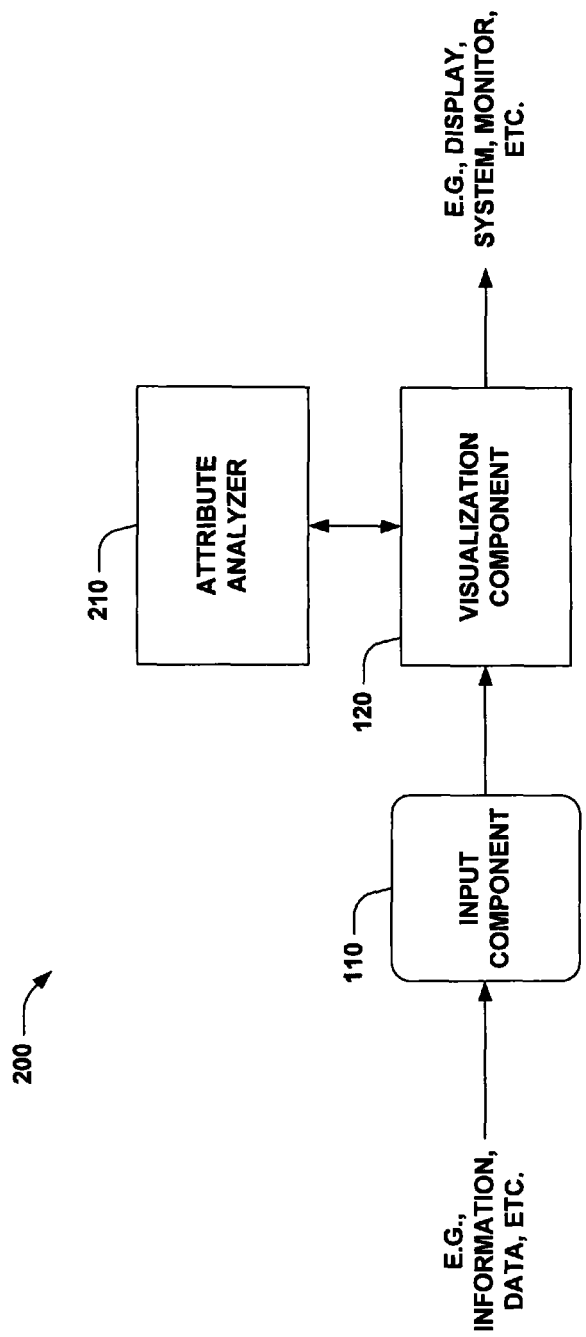
FIG. 2 illustrates an exemplary visualization component system with an attribute analyzer in accordance with an aspect of the current invention.

Turning now to FIG. 2, a system 200 is shown wherein the input component 110 is employed to receive and convey information to the visualization component 120, as noted above. An attribute analyzer 210 can be utilized to communicate with the visualization component 120 to analyze received data and determine attributes associated with such data. The attributes can be related to various aspects of the data such as the origin of the data, channels employed to transmit the data to a subscriber, process and/or system associated with the data, time and/or business logic, for example. In this manner, attributes associated with a data object can be referred to as visualization properties utilized to determine the "look" and "feel" of the data as it is displayed to a user. These properties can be provided as inherent predefined and/or user defined attributes for that data to be utilized. There can be multiple levels of visualization properties provided within each data object facilitating simple to complex viewing of the data. For example, simple viewing can refer to a simple red/yellow/green indicator while complex viewing could be a bar chart with precise numerical depiction, units, error tolerances, set points, etc.

As described, the attribute analyzer 210 can be a virtual component that resides in the visualization component 120. In this manner, the visualization component 120 can act as a host for the analyzing process to take place. Alternatively, the visualization component 120 can exchange data with the attribute analyzer 210 wherein the attribute analyzer 210 is a separate entity. A memory (not shown) and a processor (not shown) can be coupled with the attribute analyzer 210 to facilitate analysis of received data. Once analysis is complete, data and/or a listing of attributes can be transmitted to the visualization component 120 for further processing.

Figure 3:
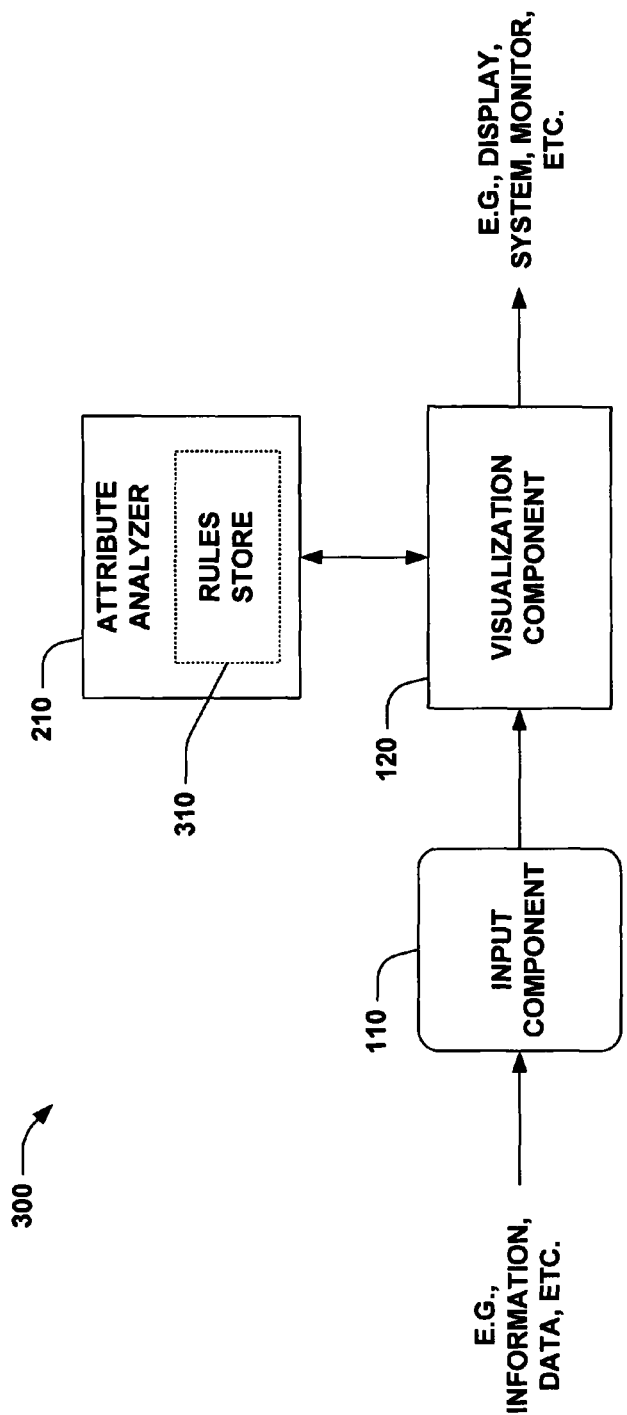
FIG. 3 illustrates an exemplary visualization component system with an attribute analyzer and a rules store in accordance with an aspect of the current invention.

Turning now to FIG. 3, illustrated is a system 300 wherein the attribute analyzer 210 is associated with a rules store 310. As shown, the attribute analyzer 210 is coupled to the visualization component 120 that receives data sent from the input component 110. The rules store 310 can be employed to create, edit and/or store rules associated with the attribute analyzer 210. A user can create rules and/or rules can be inherently created based on attributes associated with data received. For example, if data is received from a particular process within a plant, such data can inherently appear as blue, bold-faced text with a twelve-point font when output to a particular device. In such a case, a user can employ an editor to modify such inherent visualization formatting as desired.

Additionally, a user can create rules specific to various data that can be received by the visualization component to be visually formatted and output to a device. In order to create rules, the rules store 310 can provide a listing of possible attributes to the user that is associated with data received. In this manner, the user can select a desired attribute and assign it various formatting rules. Similarly, a listing of available formatting options can be presented to a user in order to simplify the rules creation process. Once a user creates a specific rule relating to a formatting configuration, he can employ the rules store 310 to store and access the rule at a later time. Thus, a user can generate and accumulate a plurality of various formats to be employed at a later date if desired. For instance, all data relating to a quenching process can have a graphic that displays a tank filled with water and a numerical field to display the data associated with the graphic. Additionally, the water level in the tank can be scaled so that the water height varies as a function of the numerical value of the data.

As shown, the rules store 310 is within the attribute analyzer 210. It is to be appreciated, however, that the rules store 310 can reside remotely from the attribute analyzer 210 and/or act as a virtual store that can be accessed from any number of locations. For example, the rules store 310 can be an HMI located on a remote computer that provides a graphical interface in order to create, edit and store attribute related rules. The HMI can provide an environment in which various routines, protocols, etc. can be employed to facilitate the development and execution of a rule(s).

In one aspect of the invention, user definable configuration rules for visualization formatting could utilize a method similar to that currently employed in standard portal technology, for example. In this approach, a user can select preferences for the visual formatting of information such as "overall process status in the top right corner of the screen", "machine uptime and maintenance log in lower right corner of screen", "navigation selection through buttons along bottom of screen" and/or "display weekly quantity history in the center of the screen."

Automatic visualization can be performed by a visualization software process using visualization rules to dynamically construct and format HMI visualization screens based upon the aforementioned configuration settings and data attributes. The visualization can be formatted for display utilizing standard web-browser display devices. Based upon the capabilities of the display device, the size and information content of the visualization screen can be adjusted accordingly. The visualization rules can provide a mechanism to provide plant, process, machine, location, and/or business rules based logic for the presentation and access control of machine or process related information.

An example of a business rule could be to "optimize process finished goods quality, then machine utilization, then material utilization." If finished goods quality is within specific limits, this can be shown as a simple status indicator. Alternatively, if the finished goods quality is not within limits, detailed quality visualization can be presented. In this aspect, the business rule along with the data itself can determine what information is presented to the user, in what manner and/or in what sequence.

Figure 4:
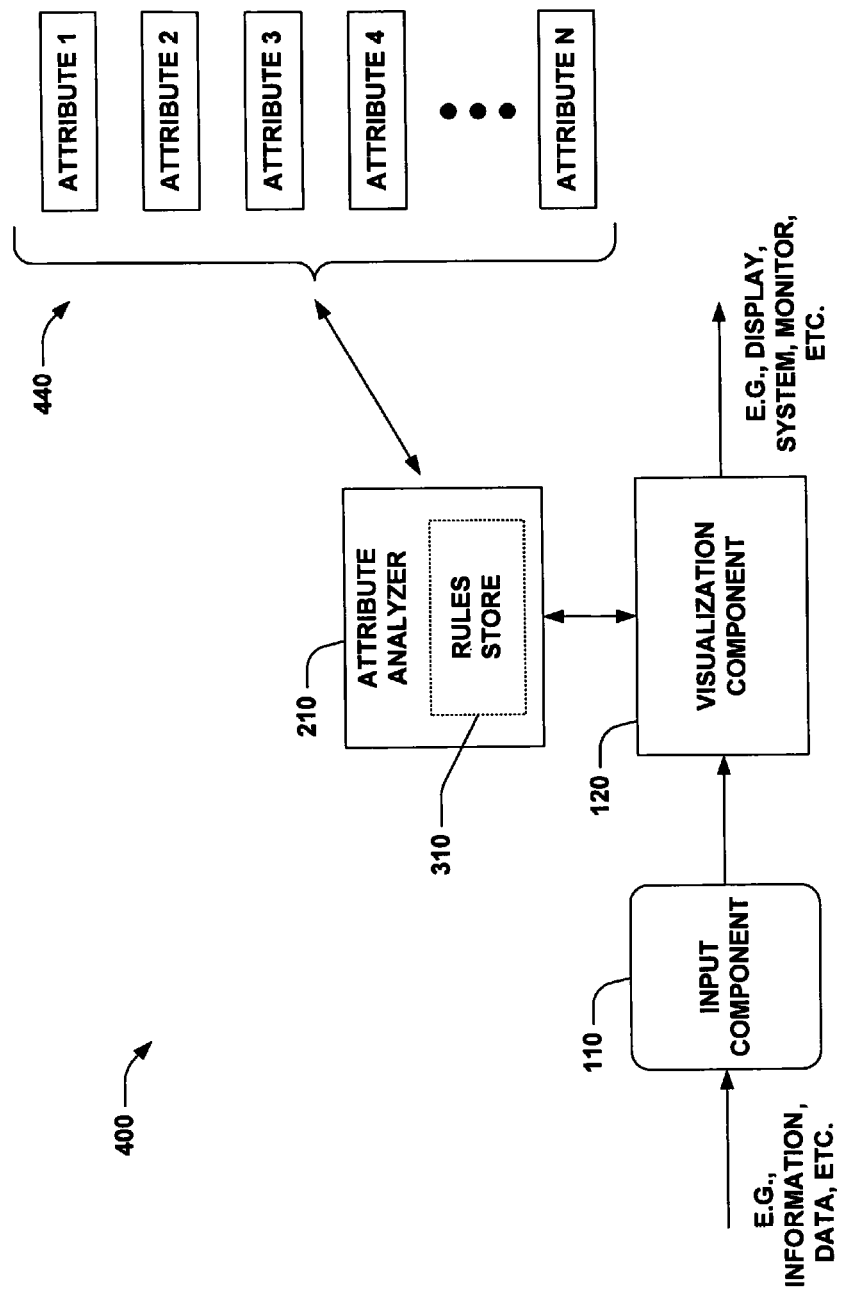
FIG. 4 illustrates an exemplary system that employs a visualization component system with an attribute analyzer and a rules store in accordance with an aspect of the current invention.

Referring briefly to FIG. 4, illustrates an exemplary system 400 that analyzes and displays attributes related to data received. The input component 110 sends data received to the visualization component 120, which is coupled to the attribute analyzer 210, and rules store 310. As shown, the attribute analyzer 210 can parse out one or more attributes 440 related to data received and display such attributes 440 to a user. It is to be appreciated that received data can have any number of attributes 440 associated therewith. In this manner, such attributes 440 can be located and recognized to facilitate further processing of the data and/or attributes 440. For example, the rules store 310 can provide a specific rule set related to a particular attribute associated with various received data.

In addition, address and interface information related to the data can be employed to change the state or force changes to one or more parameters (e.g., data values) that are displayed. When viewing a particular data value (e.g., tank level), the address provided in one of the tank level attributes can be the means to force the control system to either manually fill or drain the tank. Such attributes can be restricted and only added where such operation is permitted.

Figure 5:
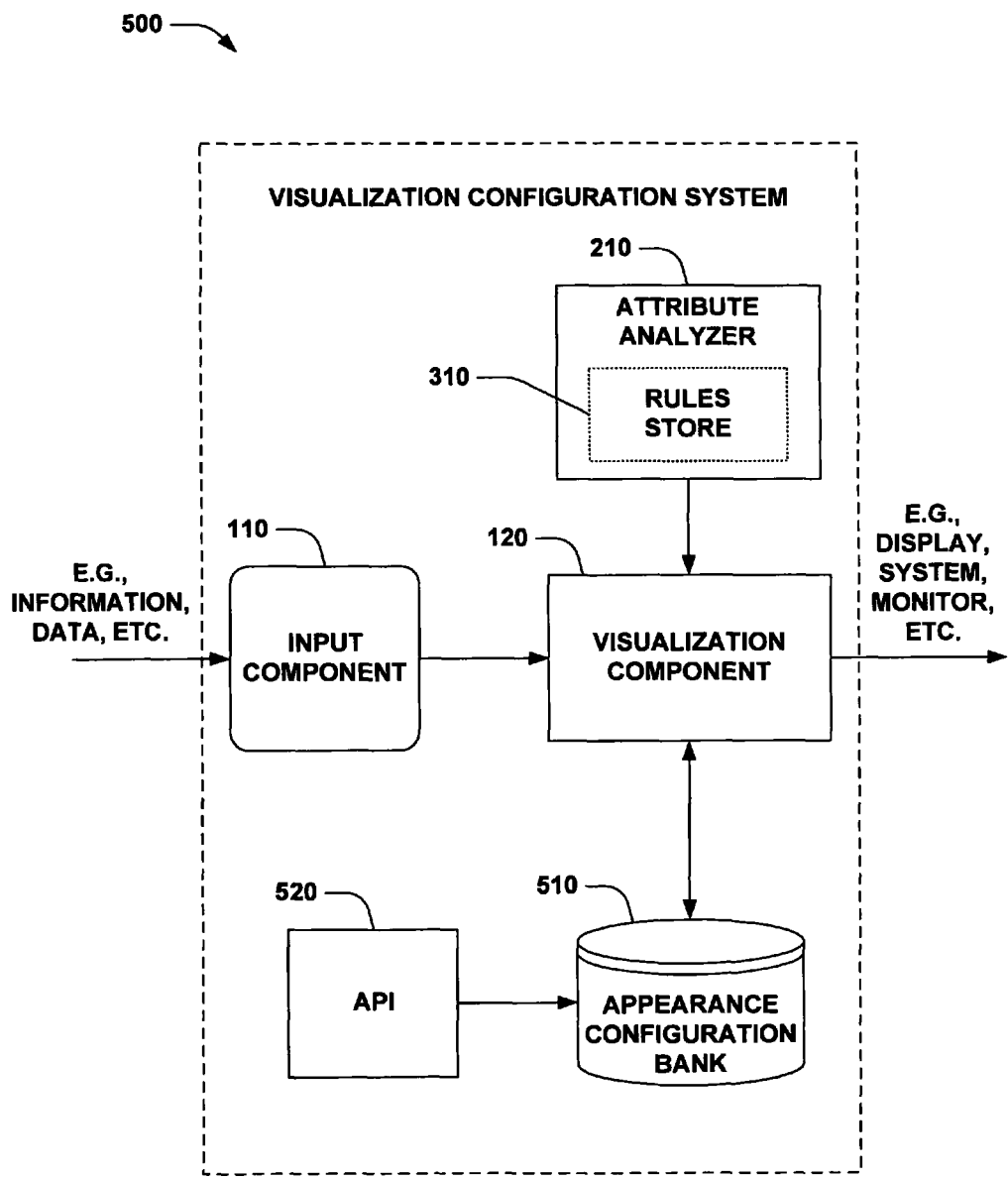
FIG. 5 illustrates an exemplary visualization configuration system in accordance with an aspect of the current invention.

FIG. 5 illustrates a visualization configuration system 500 that receives data via the input component 110 and provides visual formatting to data that is output via the visualization component 120. The visualization component 120 is coupled to the attribute analyzer 210 and the rules store 310 as discussed previously. In addition, the visualization component 120 is coupled to an appearance configuration bank (ACB) 510 which in turn is associated with an application program interface (API) 520. The ACB 510 can be employed to generate, modify and store one or more user definable appearance configurations, such as a "skin," for example. User definable "skins" can provide a means for users to set preferences for appearance related parameters such as color themes, fonts, object sizes and data display preferences. Such data display preferences can include numerical indication, gauges, bar charts, go/no-go color indicators, or combinations of these, for example.

In order to set appearance related parameters, the API 520 can be employed to provide a user interface to the ACB 510. The API 520 can be an HMI wherein a plurality of appearance configuration options can be presented to a user. For example, in an editing feature of the API 520, a user can click on a particular aspect of a screen such as the title bar of a particular software application. Once clicked, a properties window can appear before the user to allow changes to be made to the size, color, font etc. associated with the title bar. After such appearance configuration parameters have been modified, a memory (not shown) can be employed for storage and retrieval of the configuration (e.g., skin) at a later time.

Figure 6:
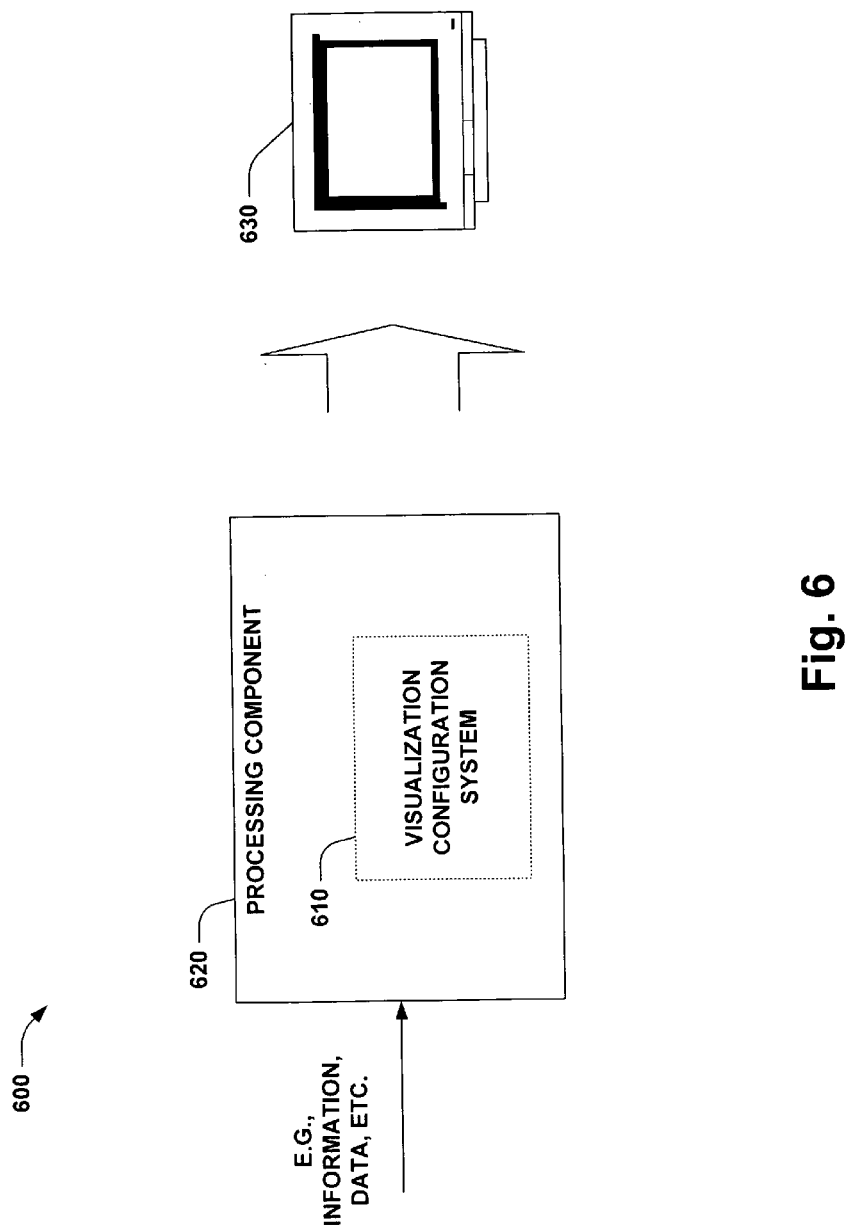
FIG. 6 illustrates an exemplary visualization configuration system employed with a processing component in accordance with an aspect of the current invention.

FIG. 6 illustrates a system 600 that comprises a visualization configuration system (VCS) 610 employed within a processing component 620. The processing component 620 can be adapted to accept data from a source to facilitate processing and output the data to a display device 630. The processing component 620 can be any device and/or system that can accept data and output such data to a display device. In this manner, data that is received by the processing device can be visually formatted based on one or more attributes. Such formatting can be performed by the VCS 610 to provide data in specific configurations as they relate to the visual display of data. For example, a VCS 610 can be a programmable logic controller, a computer, distributed I/O, a smart terminal and the like.

The display device 630 can receive formatted data utilizing various protocols, standards and/or media to convey such data. The manner of providing data to the display device can be dependent on the type of processing component 620, the type of display device 630 or both. For example, the data can be transmitted via a plurality of protocols such as RS-232, RS-485, Ethernet, ControlNet, DeviceNet and the like. In one approach, data can be transmitted via parallel cable from a processor to a monitor in a desktop PC. In addition, media such as coaxial cable, fiber optic cable, video cable, etc. can be utilized to facilitate data delivery from the processing device 620 to the display device 630.

The display device 630 can be substantially any type of device that can accept and display data to a user. For example, the display device 630 can be a laptop computer, a desktop computer, a programmable digital assistant, a workstation, a palm top computer, a cell phone, an industrial monitor, a television or a notebook computer. It is to be appreciated that although a single display device is shown, a plurality of display devices can be employed in one approach of the subject invention. The limitations and/or features of a display device 630 can determine the manner in which the data will be formatted.

The display device 630 can have an artificial intelligence (AI) component (not shown) that can determine the best manner in which the data will appear on the display device 630. For example, the AI component can determine that a display device employs a particular video driver and thus modify color and/or resolution related to data conveyed to the display device 630.

In one aspect of the subject invention, visual formatting, as well as attributes, etc. of data can be generated by machine learning wherein one or more training sets of data with examples of desired results and/or undesired results for searches can be utilized to train the system. In another aspect of the subject invention, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query and results that are ignored by the user can be employed to train the system to learn undesired results of the query. In addition, the frequency of utilization of a result can further enhance such learning. For example, a result that is accessed more times by the user can be deemed more useful to the user. In this manner, if a particular subscriber employs a specific data type more times than another, that data type can be utilized in the future.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject invention.

In yet another aspect of the invention, a technique can be employed to anticipate the visualization attributes and display of particular data. For example, information such as historical data representing data and attributes associated with such data utilized with various display devices can be employed to predict the visual formatting of the data with the display device 630. For example, intelligent based decisions based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the subject invention. In this manner, the AI component (not shown) can be employed by the display device 630 to provide decision making based on learned actions of a particular attribute in relation to the display device 630.

Figure 7:
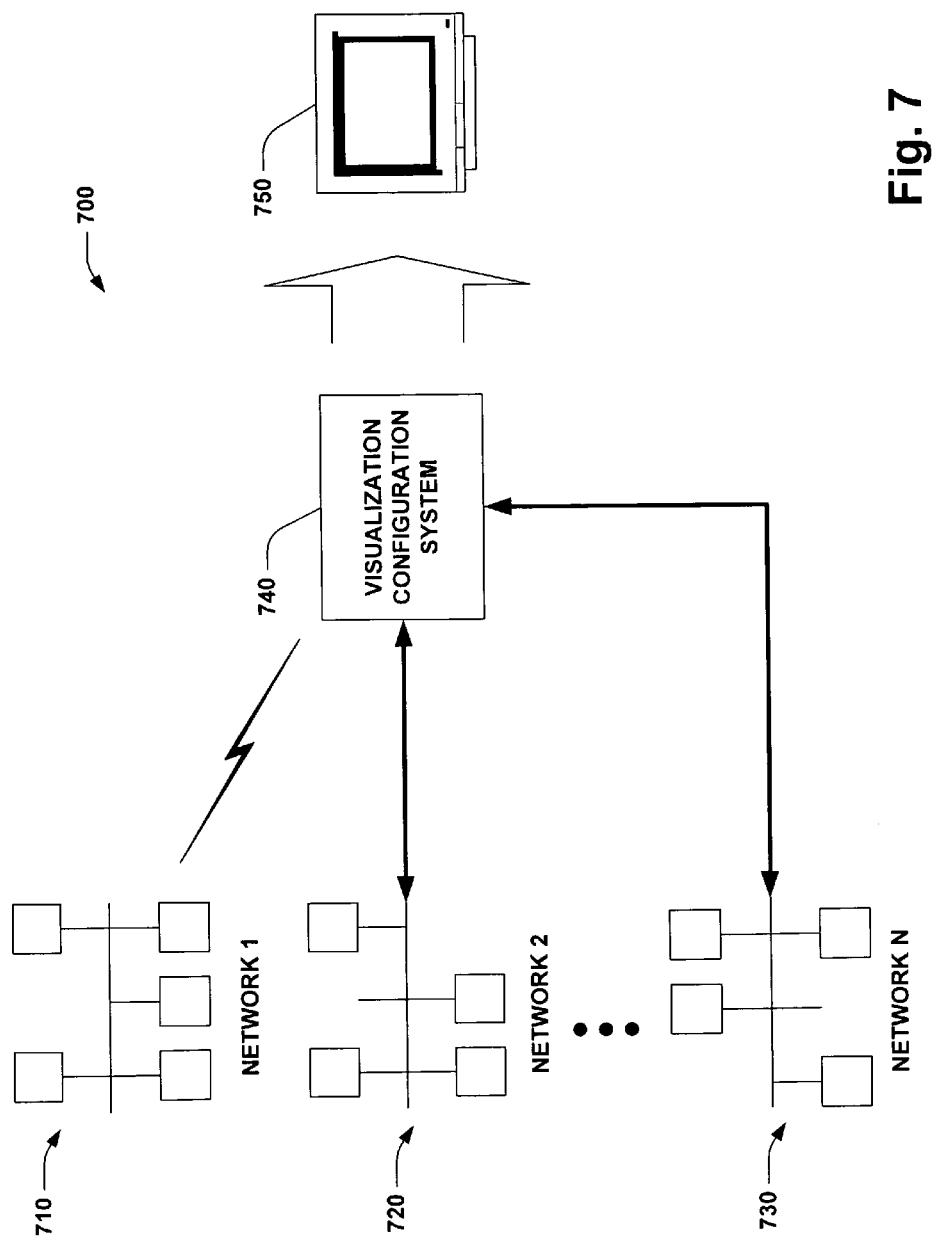
FIG. 7 illustrates an exemplary visualization configuration system in a network environment in accordance with an aspect of the current invention.

Referring now to FIG. 7, which shows an exemplary system 700 wherein a network 1 (710), a network 2 (720) and a network N (730) are coupled to a visualization configuration system (VCS) 740. It is to be appreciated that the VCS 740 can be coupled to N number of networks, where N is an integer greater than or equal to one. In addition, the VCS 740 can be coupled to a network employing a plurality of means including wireless (e.g., network 1) and wired (e.g., network 2, network N) technologies and/or protocols. Such protocols can include wireless Ethernet, infrared, Blue Tooth, ControlNet, DeviceNet, Profibus and the like. The VCS 740 can be associated with one or more devices such that the VCS 740 is local or remote to such devices.

Each network 710-730 can comprise a plurality of devices that are coupled together utilizing various network architectures and/or protocols to facilitate communication between such network devices. Each network 710-730 can accommodate any number of devices that can interface to other components to provide electronic control of one or more processes, for example. In addition, the networks 710-730 can employ one or more servers to channel data from a source (e.g., drive, servo, measurement sensor, temperature sensor, switch, etc.) to a subscriber (e.g., programmable logic controller, computer, digital control system, etc.). Further, such data can be sent from one or more servers to a proxy server employed to accept data from disparate servers within a data driven architecture, such as the system 700.

Data conveyed between the one or more networks 710-730 and the VCS 740 can be sent based on a number of factors. For example, the data can be "pulled" from the networks 710-730 by the VCS 740 on a periodic basis and/or when a particular condition (e.g., specific data exceeds a predetermined value, time, etc.) is met. In addition, the VCS 740 can accept data from one or more networks 710-730 when a particular network attempts to deliver such data. For instance, the network 710 can attempt to deliver data once a specific process related to it is complete. In addition, the VCS 740 can poll the one or more networks to determine when data can be delivered and in what fashion (e.g., size of data, protocol, conduit, etc.) In this manner, data can be exchanged between the networks 710-730 and the VCS 740 in substantially any desired configuration.

The display device 750 can be one or more devices that can accept and display data received to a user. Such a display can occur utilizing a monitor, providing audio sounds, employing telephony and any number of methods and/or systems employed to communicate information to a user. The display device 750 can be an LED scroll bar, marquee, PA system, telephone, stereo, flat screen monitor, etc. In this manner, the data can be conveyed to a user in any desired audio or visual format. Moreover, such formatting can be configured based on attributes related to the data (e.g., channels the data employed to convey such data from a source to subscriber). For instance, attributes can be related to data that employs server A in plant 1 and proxy server 77 in the main plant to be transmitted from a source to a subscriber. In this example, the data can be displayed as text that is italicized and underlined with a font size of 80. Other configurations can be employed based on data attributes that provide inherent and/or programmed visual configuration and/or formatting. One skilled in the art can appreciate the limitless possibilities associated with the formatting and display of data based at least in part upon attributes associated with such data.

Figure 8:
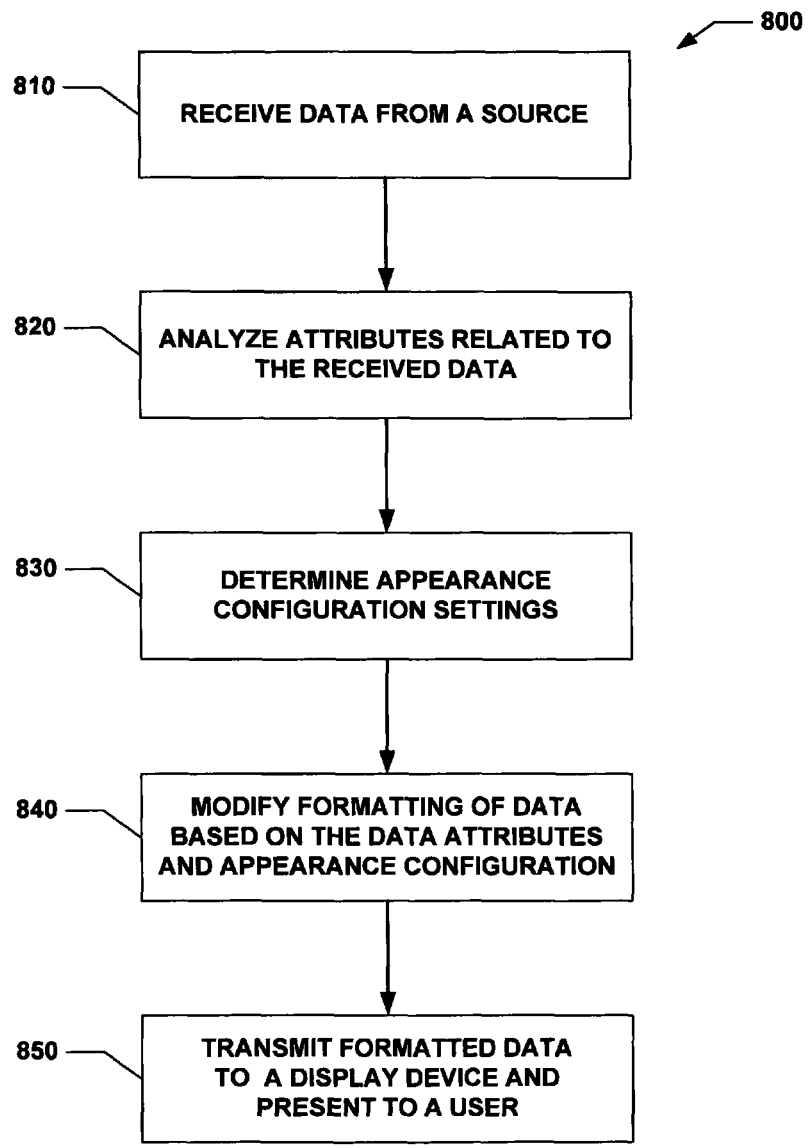
FIG. 8 illustrates an exemplary methodology that receives and transmits formatted data to a display device.
Figure 9:
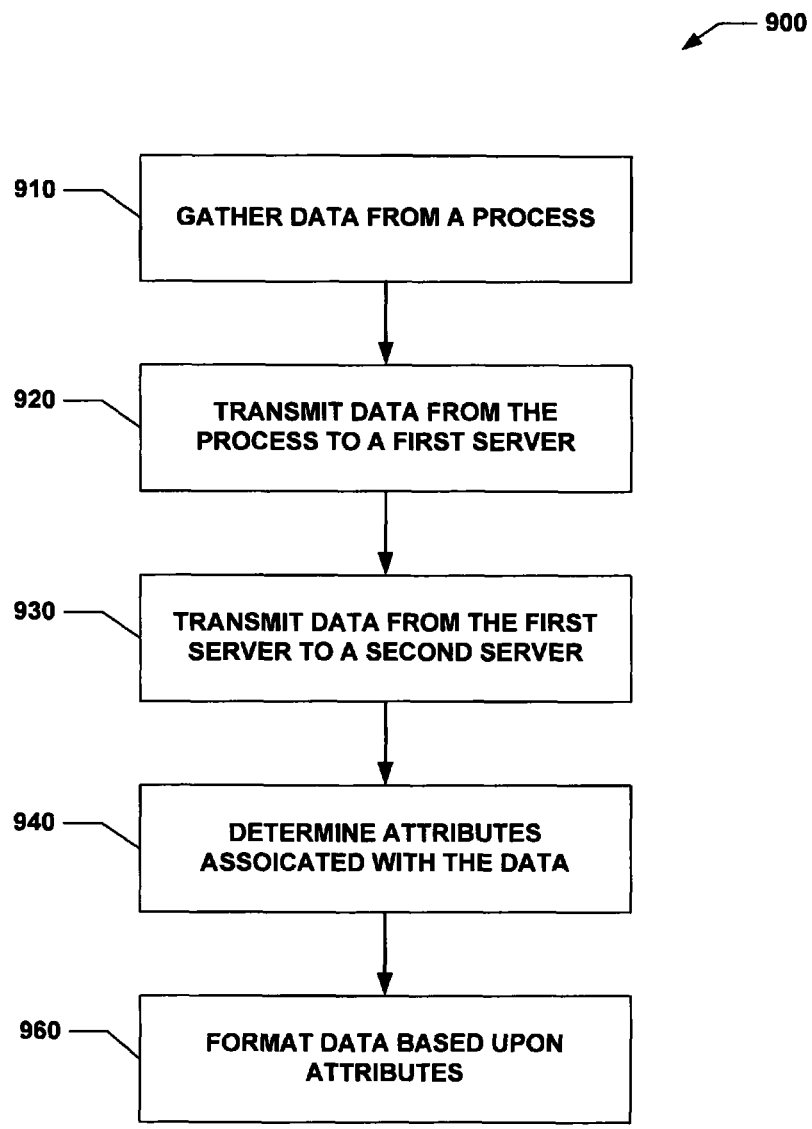
FIG. 9 illustrates an exemplary methodology that formats data based upon attributes of the data.
Figure 10:
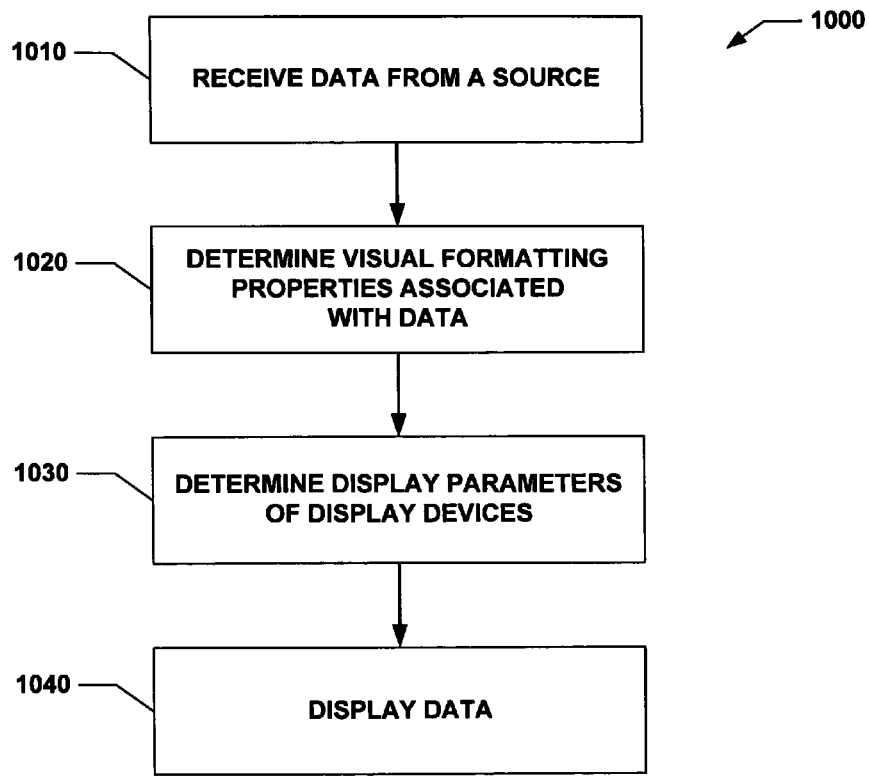
FIG. 10 illustrates an exemplary methodology that displays data received from a source.

FIGS. 8, 9 and 10 illustrate methodologies 800, 900 and 1000 in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

Referring now to FIG. 8, illustrated is a methodology 800 to format and display data to a user. At 810, data is received from a source wherein the source can be substantially any device and/or component that can generate data and communicate such data to another device and/or component. Data can be conveyed periodically, based on a condition, or when polled, for example. In addition, the data can be provided in desired protocols in order as needed to move data throughout a system, for example. Data can be received via a hardware and/or a software interface that can be configured to accept such data.

At 820, attributes are analyzed which are related to the received data. The attributes can be related to various channels in which the data is conveyed from the source to the component and/or device that receives the data. For example, if data is transmitted from a source to a server X, transmitted from server X to proxy server 17 and then transmitted to a data subscriber, the data channels can be conveyed as attributes and sent along with the data. It is to be appreciated that such attributes can be cumulative based on the various paths/routes/channels employed to convey data from a source to a subscriber, such as the source and the server X, for example. The attributes may not describe the communication path but rather varying degrees of visualization information and/or sophistication. In addition, the data 'title' or descriptive name can also be an attribute. Such attributes can be transmitted with the data such that the attributes are received before, after or simultaneous to the reception of the data.

At 830, appearance configuration settings (ACS) are determined. The ACS or "skins" provide a means for a user(s) to set preferences related to appearance related parameters such as color themes, fonts, object sizes and data display preferences. For example, data display preferences could include numerical indication, gauges, bar charts, go/no-go color indicators or a combination of these. At 840, the formatting of the data is modified based on the data attributes and appearance configuration. Such formatting can refer to size, color, font, graphics, etc. employed to display data to a user, as noted above.

At 850, the formatted data is transmitted to a display device and presented to a user. The display device can be substantially any system that can receive data and present such data to a user. For example, the display device can be a monitor, a laptop computer, a PC, a personal digital assistant or a cell phone. The data can be presented to the display device in a specific area of the device (e.g., upper right corner, bottom center, etc.) and/or justified as desired. In addition, the data can be re-sized so that it is proportional in relation to the display (e.g., screen, monitor, etc.) of the device. For example, data displayed to a desktop CRT can be one size and the same data can be re-sized to smaller proportions to be presented in a cell phone display. Once data is presented to the user, he can manipulate the data utilizing any number of programs (e.g., HMI, API, etc.) to make changes to various aspects of the data as desired.

FIG. 9 shows an exemplary methodology 900 wherein data is gathered and formatted based on attributes associated with the data. At 910, data is gathered from a process. The process can be related to various operations and/or methods associated with industrial control, for example. Such industrial control can be employed to monitor and/or control manufacturing, production, quality, finishing, building, etc. operations, for example. In addition, data can be gathered utilizing a processor, a terminal, a digital control system, a computer and the like. Such data can be transmitted to the gathering device at specific times, or as desired by the user. The data can be related to various units of measure and be scaled to minimum and maximum limits as desired by the user. For example, the data can be in volts, amperes, ohms, pulses, etc. and can be gathered in accordance with specific protocols such as ASCII, digital, analog, and the like.

At 920, the data is transmitted from the process to a first server. The server can be employed with any number of server platforms (e.g., hardware and/or software) to provide an engine that drives the server. In addition, the server can be one or more types of servers such as an application server, an audio/video server, a chat server, a fax server, an FTP server, a groupware server, an IRC server, a list server, a mail server, a news server, a proxy server, a telnet server and/or a web server. In addition, the server can be a location where data is stored and/or processed such as a PLC, automation controller, digital control system (DCS) and the like. It is to be appreciated to one skilled in the art that each server can have specific protocols and/or standards related to transmitting and/or receiving data and for the sake of brevity will not be mentioned in detail.

Further, the first server can be located remotely or locally to the location(s) of the data which is gathered. For example, data can be gathered from a single process that encompasses a multitude of disparate locations. Thus, the server can be local with regard to some aspects of the process and remote with other aspects. In addition, the manner in which the data is transmitted can employ wireless and/or wired technologies to convey data from a source to the first server. At 930, the data is transmitted from the first server to a second server employing various protocols, formats, standards and media as mentioned supra. It is to be appreciated that the methods outlined herein are non-exhaustive and that one skilled in the art can appreciate that any number of methods can be employed to transmit and/or receive data from the source to the servers, between servers and from the second server to the device that determines attributes related to the data conveyed.

At 940, attributes associated with the data are determined. As noted, some data sources can provide direct data with a time stamp, for example, while other data can directly support transactional capabilities and still others can support more extensive attributes such as HMI visualization attributes with varying degrees of sophistication. In addition, some devices can perform as servers adding attributes to the data from other devices. Such attributes can be determined utilizing a device and/or process for such purpose. The attributes can be related to the source of the data, the channels employed to convey the data, visualization configuration, etc. After the attributes have been determined, they can be stored in a memory (not shown) or similar storage device to retrieve and utilize at a later time.

At 960, the data is formatted based upon attributes. As noted herein, such data formatting can be accomplished by considering any number of factors such as role and location of a user viewing the data, capabilities of a display device, process to be viewed, time and/or business logic. In addition, formatting can refer to the size, shape, color, associated graphics, etc. of the data as it relates to how the data is presented to a user(s). Further, the data can be formatted at disparate levels such as simple, moderate and complex. For example, data can be presented as a simple multi-color indicator, or complex with specific data points mapped in relation to an associated graphic. By way of further example, data can have various formatting based on user preferences. For instance, particular data can have seven formatting configurations each related to one of seven users.

Turning now to FIG. 10, illustrated is a methodology 1000 to receive data from a source and display such data. At 1010 data is received from a source. The source can be a hardware device, software platform, combination of hardware and software, etc. that can transmit data utilizing various methods and/or protocols mentioned supra. In addition, data can be received from the source on a periodic basis, when a condition is met, a single time, etc. as desired. At 1020, visual formatting properties associated with the data are determined. Such visual formatting properties can relate to the manner in which data is presented to a user such as the screen location, levels of formatting, user configurations, etc. For example, visual formatting properties can include employing a moderate formatting level with user "John Smith" to present data as a pie chart related to several desired production metrics.

At 1030, display parameters of the display device are determined. Such display parameters can include bandwidth, dot clock, horizontal scan rate, refresh rate, interlacing, dot pitch, etc. of the device. Further, size of the screen (e.g., 3", 8", 14", 15", 17", 20", etc.) and screen resolution (e.g., 640×480, 800×600, 1024×768 and 1280×1024, etc.) can affect the appearance of visually formatted data. Thus, identically visually formatted data can be presented differently to a user if such data is sent to disparate devices with disparate display parameters. It is to be appreciated that display parameters can be consonant with various display devices. For instance, a cell phone can have a smaller screen and lower resolution than a desktop computer monitor. At 1040, the data is displayed to the user. Data can be displayed based at least upon the visual formatting properties associated with the data and the parameters associated with the display device, as noted above.

Figure 11:
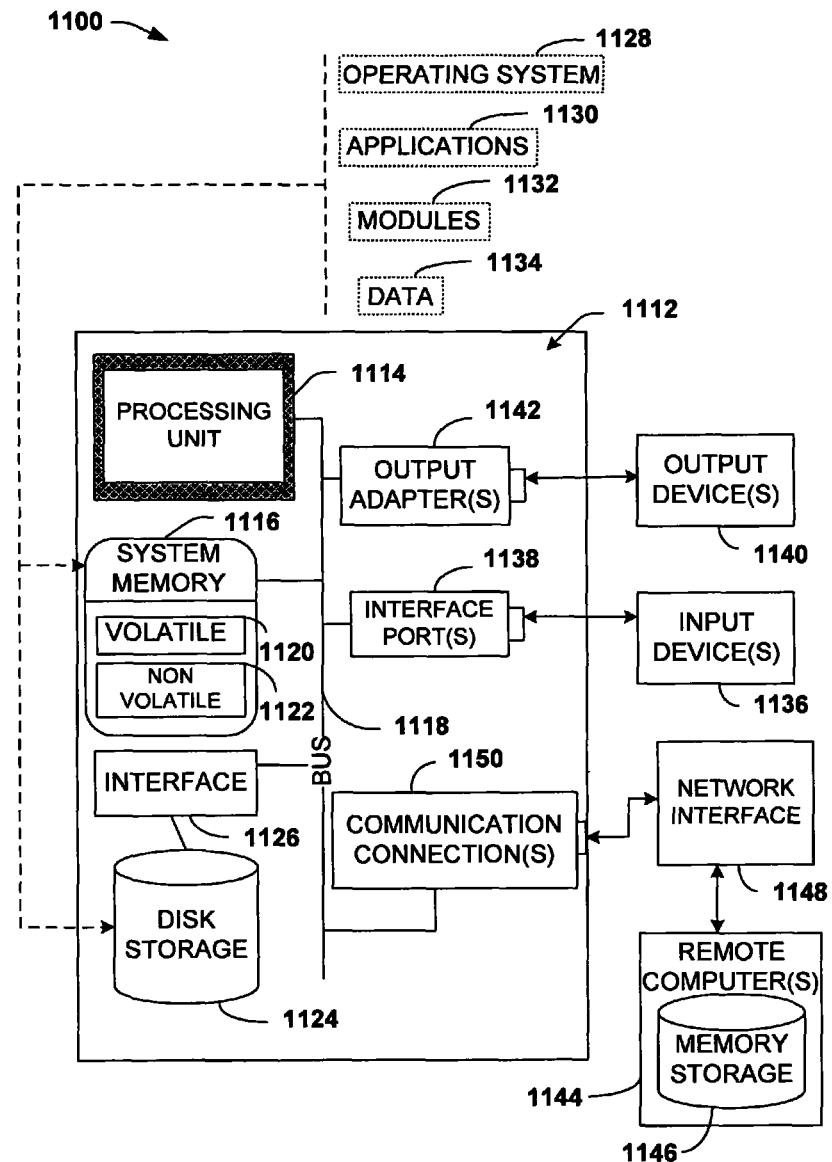
FIG. 11 illustrates an exemplary computing environment wherein the invention can be employed.

With reference to FIG. 11, an exemplary environment 1100 for implementing various aspects of the invention includes a computer 1112 is depicted. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
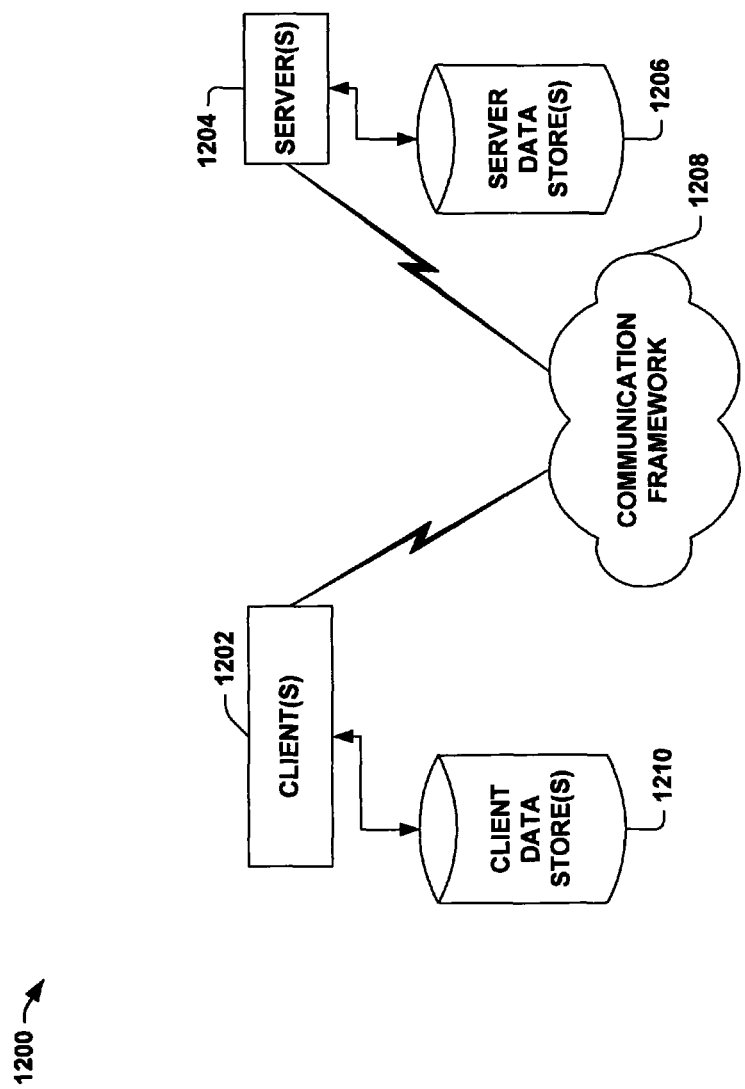
FIG. 12 illustrates an exemplary network wherein the invention can be employed.

FIG. 12 illustrates an exemplary computing environment 1200 in which the subject invention can be employed. The system 1200 includes one or more client(s) 1210. The client(s) 1210 can be hardware and/or software (e.g., threads, processes, computing devices). The system 1200 additionally includes one or more server(s) 1230. Likewise, the server(s) 1230 can be hardware and/or software (e.g., threads, processes, computing devices).

One possible communication between a client 1202 and a server 1204 can be in the form of a data packet transmitted between two or more computer processes. The system 1200 further includes a communication framework 1208 that can be employed to facilitate communications between the client(s) 1202 and the server(s) 1204. The client(s) 1202 can interface with one or more client data store(s) 1210, which can be employed to store information local to the client(s) 1202. Similarly, the server(s) 1204 can interface with one or more server data store(s) 1206, which can be employed to store information local to the servers 1204.

What has been described above includes examples of the subject invention. It is, of course, not possible to describe every conceivable combination of components or methodologies for purposes of describing the subject invention, but one of ordinary skill in the art can recognize that many further combinations and permutations of the subject invention are possible. Accordingly, the subject invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature can be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A system that provides automatic visualization configuration in an industrial environment, comprising:
    at least one computer processor, residing within the industrial environment, that executes computer executable components stored on at least one non-transitory computer readable storage medium, the computer executable components comprising:
    an input component configured to receive process data, associated with an industrial process, that is collected by an industrial automation device, and attribute data representing one or more attributes hierarchically added to the process data, wherein the one or more attributes are indicative of a source of data through which the process data is routed; and
    an analyzer configured to parse the one or more attributes and based on an analysis of the one or more attributes, identify an amount of display data related to the process data that is to be displayed via a graphical representation; and
    an appearance configuration component that is configured to modify display property associated with the graphical representation based on an environment in which the display data is displayed, wherein the appearance configuration component is further configured to display a first graphical representation to represent the display data in response to a first determination that one or more attributes satisfy a predefined criterion, and display a second graphical representation to represent the display data in response to a second determination that the one or more attributes fail to satisfy the predefined criterion, wherein the first graphical representation provides more detailed information regarding the display data than the second graphical representation.

2. The system of claim 1, wherein the display property comprises at least one of a color theme, a font, or an object size associated with the data to be displayed.

3. The system of claim 1, further comprising:
    a rules store configured to retain a configuration rule to format display properties associated with the display data.

4. The system of claim 1, wherein the analyzer is further configured to modify the display property based on at least one of a role of a user viewing the data, a location of the user viewing the data, or time.

5. The system of claim 1, wherein the display property includes at least one of a font, a text size, a color, a translational motion, a rotational motion, an animation, or a screen location.

6. The system of claim 1, further comprising:
    a presentation device that is configured to display the graphical representation.

7. The system of claim 6, wherein the presentation device is one of a laptop computer, a desktop computer, a programmable digital assistant, a workstation, a portable computer, a cell phone, a monitor, or a notebook computer.

8. The system of claim 1, wherein the one or more attributes comprise multiple levels, each level relating to a disparate aspect of formatting the process data.

9. The system of claim 1, wherein the one or more attributes are at least one of inherent, predefined, or user defined.

10. The system of claim 1, wherein the graphical representation displayed along with context data associated with the display data.

11. The system of claim 1, further comprising:
    a rules store configured to at least one of create, edit, or store a user defined rule associated with the analyzer, the user defined rule facilitates configuration of the display property.

12. The system of claim 1, further comprising:
    an appearance configuration bank configured to modify and store at least one user definable appearance configuration.

13. The system of claim 12, wherein the appearance configuration bank further comprises an application program interface that is configured to provide a user interface for the appearance configuration bank.

14. The system of claim 1, wherein the graphical representation includes at least one of a numerical indication, a gauge, a bar chart, a pie chart, a dial, a slider, or a color indicator.

15. The system of claim 1, wherein the attribute data specifies a sequence in which the process data is to be displayed.

16. A computer implemented method for automatic configuration of data comprising:
    receiving, by a system including at least one processor, process data associated with an industrial process collected by a source device within an industrial environment;
    receiving, in addition to the process data, attribute data including one or more hierarchical attributes indicative of a data channel through which the process data is routed;
    based in part on analyzing the attribute data, determining an amount of display data related to the process data that is to be displayed via a graphical representation;
    modifying display property associated with the graphical representation based on an environment; and
    generating a first graphical representation to represent the display data, in response to determining that the attribute data satisfies a predefined criterion, and generating a second graphical representation to represent the display data, in response to determining that the attribute data does not satisfy the predefined criterion, wherein the first graphical representation provides a greater amount of information regarding the display data than the second graphical representation.

17. The method of claim 16, wherein the receiving the process data includes receiving the process data routed via one or more devices within the data channel.

18. The method of claim 16, further comprising:
    configuring at least one setting related to the graphical representation based in part on an environment in which the display data is displayed.

19. The method of claim 18, wherein the configuring includes configuring at least one of a color theme, a font, an object size, or a data display preference associated with the graphical representation.

20. The method of claim 16, further comprising:
    employing at least one pre-defined configuration rule to format one or more display properties associated with the graphical representation.

21. The method of claim 16, further comprising:
    formatting the graphical representation based in part on at least one of a role of a user viewing the data, a location of the user viewing the data, a capability of a display device, a process to be viewed, time, or business logic.

22. The method of claim 16 further comprising:
    facilitating a transmission of the graphical representation to a display device.

23. The method of claim 16, further comprising:
    identifying context data associated with the display data;
    facilitating a presentation of the context data with the graphical representation.

24. The method of claim 16, further comprising:
    facilitating a display of the graphical representation via at least one of a laptop computer, a desktop computer, a programmable digital assistant, a workstation, a palm top computer, a cell phone, an industrial monitor, a television, or a notebook computer.

25. The method of claim 16, further comprising:
    facilitating a display of the graphical representation as at least one of a numerical value, a gauge, a bar chart, or a color indicator.

26. The method of claim 16, further comprising:
    based in part on the attribute data, formatting at least one of a size, a color, a font, or a graphic within the graphical representation.

27. The method of claim 16, further comprising:
    facilitating a display of the graphical representation based in part on a sequence specified by the attribute data.

28. A non-transitory computer readable storage medium comprising computer-executable instructions that, in response to execution, cause a system to perform operations, comprising:
    obtaining, via a data channel, process data associated with an industrial process that is collected by an industrial automation device within an industrial automation environment;
    receiving attribute data representing one or more attributes hierarchically added to the process data, including receiving attribute data indicative of the data channel through which the process data is routed; and
    based in part on analyzing the attribute data, determining an amount of display data related to the process data that is to be displayed via a graphical representation;
    modifying display property associated with the graphical representation based on an environment; and
    generating a first graphical representation to represent the display data, in response to determining that the attribute data satisfies a predefined criterion, and generating a second graphical representation to represent the display data, in response to determining that the attribute data does not satisfy the predefined criterion, wherein the first graphical representation provides a greater amount of information regarding the display data than the second graphical representation.

29. The non-transitory computer readable storage medium of claim 28, wherein the operations further comprise:
    formatting the graphical representation based in part on at least one of a role of a user viewing the data, a location of the user viewing the data, or time.

30. The non-transitory computer readable storage medium of claim 28, wherein the operations further comprise:
    determining context data associated with the display data that is to be displayed with the graphical representation.

* * * * *